US008631905B2

(12) United States Patent
Parrish

(10) Patent No.: US 8,631,905 B2
(45) Date of Patent: Jan. 21, 2014

(54) LADDER APPARATUS

(76) Inventor: Jack Parrish, LaSalle, IL (US)

( * ) Notice: Subject to any disclaimer, the term of this patent is extended or adjusted under 35 U.S.C. 154(b) by 260 days.

(21) Appl. No.: 13/074,868

(22) Filed: Mar. 29, 2011

(65) Prior Publication Data

US 2011/0266402 A1 Nov. 3, 2011

Related U.S. Application Data

(60) Provisional application No. 61/341,286, filed on Mar. 29, 2010.

(51) Int. Cl.
*B60R 9/06* (2006.01)

(52) U.S. Cl.
USPC ........ 182/127; 248/237; 248/238; 248/276.1; 248/284.1; 224/405

(58) Field of Classification Search
USPC ............ 248/237, 238, 284.1, 276.1; 224/405, 224/403, 310; 296/3; 182/127; 414/462
See application file for complete search history.

(56) References Cited

U.S. PATENT DOCUMENTS

| | | | | |
|---|---|---|---|---|
| 3,262,517 | A * | 7/1966 | Malec | 182/2.6 |
| 3,584,703 | A * | 6/1971 | Lane | 182/127 |
| 3,605,943 | A * | 9/1971 | Beaudet et al. | 182/66.2 |
| 3,672,612 | A * | 6/1972 | Laing, Jr. | 248/503 |
| 4,909,352 | A * | 3/1990 | McComb | 182/127 |
| 5,297,912 | A * | 3/1994 | Levi | 414/462 |
| 5,398,778 | A * | 3/1995 | Sexton | 182/127 |
| 5,850,891 | A * | 12/1998 | Olms et al. | 182/127 |
| 6,045,102 | A * | 4/2000 | Terenzoni | 248/238 |
| 6,360,930 | B1 * | 3/2002 | Flickenger | 224/310 |
| 7,137,479 | B2 * | 11/2006 | Ziaylek et al. | 182/127 |
| 7,549,831 | B2 * | 6/2009 | Hendley et al. | 414/462 |
| 2006/0169536 | A1 * | 8/2006 | Davis | 182/127 |

* cited by examiner

*Primary Examiner* — Amy J Sterling
(74) *Attorney, Agent, or Firm* — Rockey & Lyons; Matthew De Preter, Esq.

(57) ABSTRACT

The present invention is directed to a ladder apparatus capable of being mounted to a vehicle. The ladder apparatus generally comprises a mounting support, a main ladder support for receiving an extension ladder, and a torsion support. The mounting support, the main ladder support and the torsion support are pivotally connected so that the apparatus can be raised from a retracted home position to an extended position. When the apparatus is in the extended position it can be set to a desired height and/or rotational position.

20 Claims, 17 Drawing Sheets

LADDER APPARATUS

CROSS-REFERENCE TO RELATED APPLICATIONS

This application claims priority to U.S. Provisional Patent Application Ser. No. 61/341,286 filed Mar. 29, 2010, the entire disclosure of which is incorporated herein by reference. Priority to this application is claimed under 35 U.S.C. §§119 and/or 120.

BACKGROUND OF THE INVENTION

1. Field of the Invention

The present invention is generally related to a ladder apparatus, namely a ladder system mounted to a vehicle, and more particularly to a freestanding ladder system that is operable by a single user and is capable of being adjusted in multi-directional positions.

2. Description of the Prior Art

Service and repair jobs involving maintenance of telephone lines, electrical lines, landscaping, signage and the like require proper equipment to safely and efficiently access hard to reach areas. Extension ladders are currently available for such service and repair usages, but require more than one person to safely utilize the extension ladder and any extension attachments. Such equipment is often heavy and cumbersome to transport. Furthermore, currently available extension ladders are restrictive in their directional movement and require a support to lean or prop against. Bucket trucks or power baskets are also available and provide for multi-directional movement, but those trucks are expensive and costly to maintain. Often times the cold weather adversely effects bucket trucks and power baskets by freezing the lines, rams and hoses. Additionally, the high price of fuel makes operating such utility vehicles less than desirable.

The present invention provides a ladder apparatus that is readily mountable on any service vehicle and is capable of receiving a standard extension ladder. The ladder apparatus of the present invention is multi-directional, requires no footing, and is operable by a single user. The present invention offers a cost effective and low maintenance solution to currently available ladder systems because it operates without the need for rams, pumps, hoses or fluid.

While ladders and ladder systems according to the prior art provide a number of advantageous features, they nevertheless have certain limitations. The present invention is provided to solve the problems discussed above and other problems, and to provide advantages and aspects not provided by prior art devices of this type. A full discussion of the features and advantages of the present invention is deferred to the following detailed description, which proceeds with reference to the accompanying drawings.

SUMMARY OF THE INVENTION

The present invention is directed to a ladder apparatus capable of being mounted to a vehicle. The ladder apparatus generally comprises a mounting support, a main ladder support for receiving an extension ladder, and a torsion support. The mounting support, the main ladder support and the torsion support are pivotally connected so that the apparatus can be raised from a retracted home position to a multi-directional extended position. When the apparatus is in the extended position it can be set to a desired angular position and/or rotational position.

These and other aspects of the present invention will become apparent to those skilled in the art after a reading of the following description of the preferred embodiment when considered with the drawings, as they support the claimed invention.

BRIEF DESCRIPTION OF THE DRAWINGS

To understand the present invention, it will now be described by way of example, with reference to the drawings and photographs in which.

DETAILED DESCRIPTION

Figure 1:
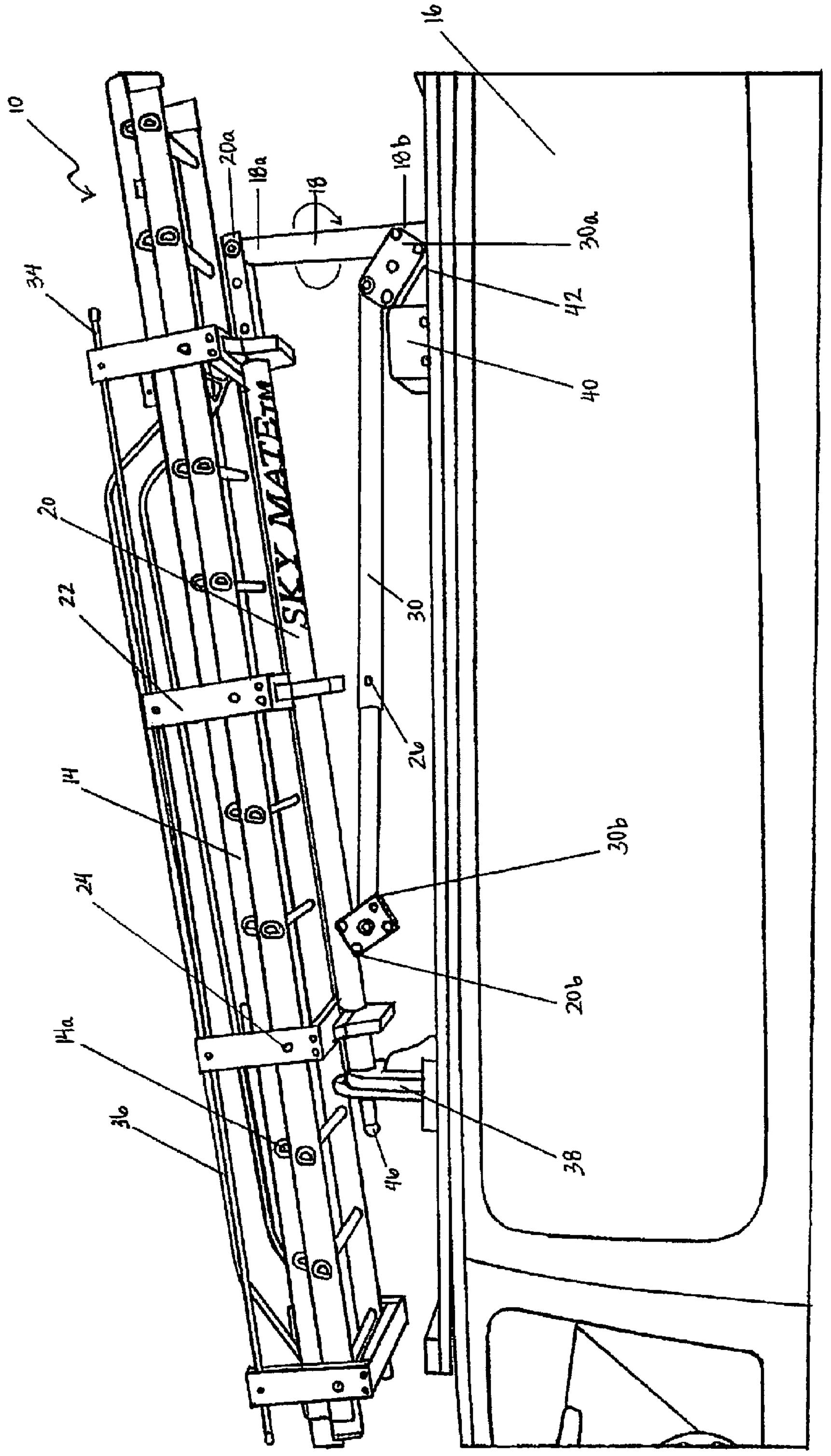
FIG. 1 is a side elevation view of the ladder apparatus.

While this invention is susceptible of embodiments in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-17 show the ladder apparatus of the present invention, generally designated with reference numeral 10 which is designed to receive a standard ladder or extension ladder 14. The ladder apparatus 10 is intended to be mounted to a vehicle 16 and is operable by a single user. The present invention is further designed to be freestanding, requiring no footing when in operation, and is capable of moving in multiple directions.

Figure 2:
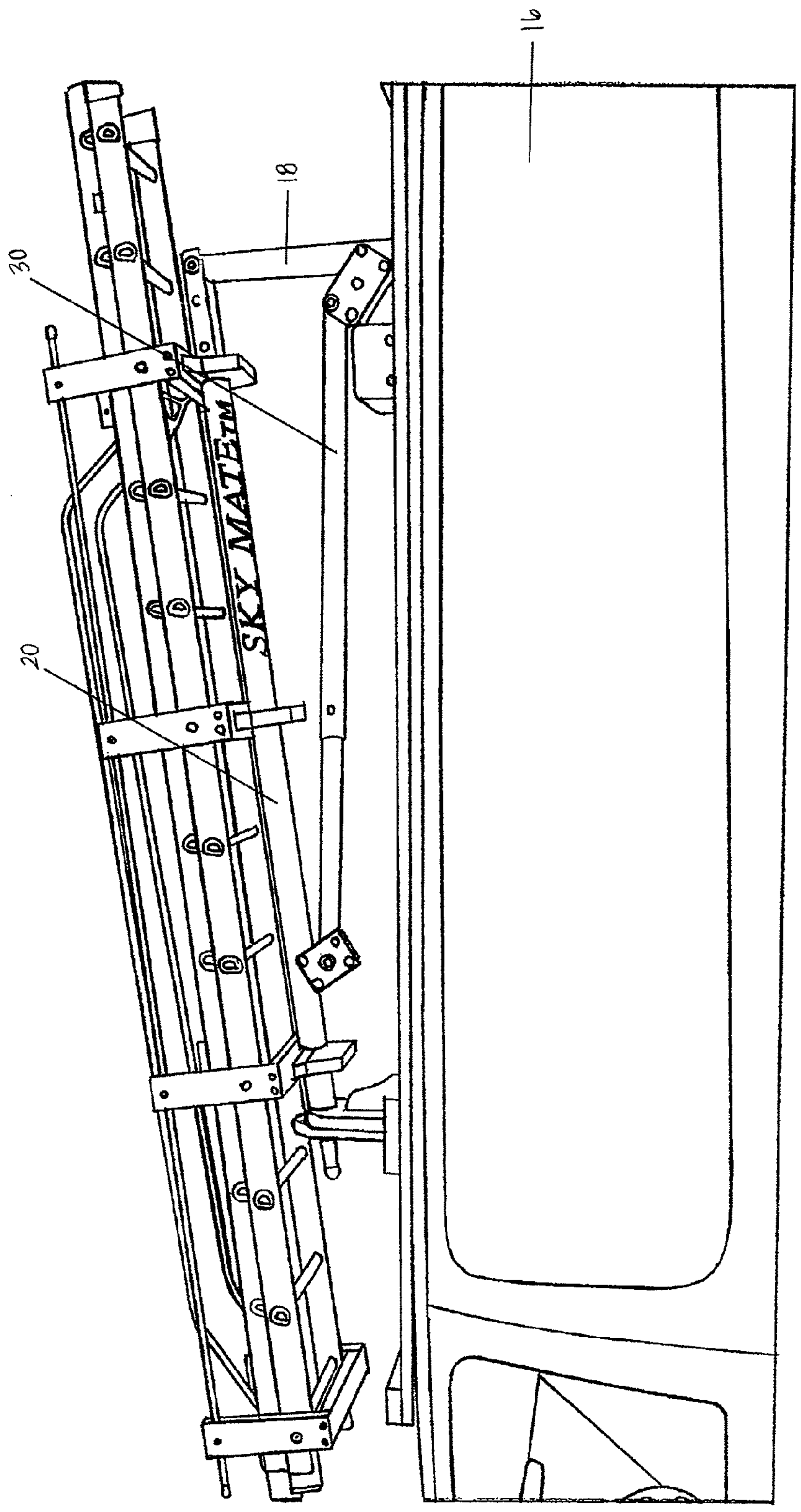
FIG. 2 is a side elevation view of the ladder apparatus mounted on a vehicle.
Figure 3:
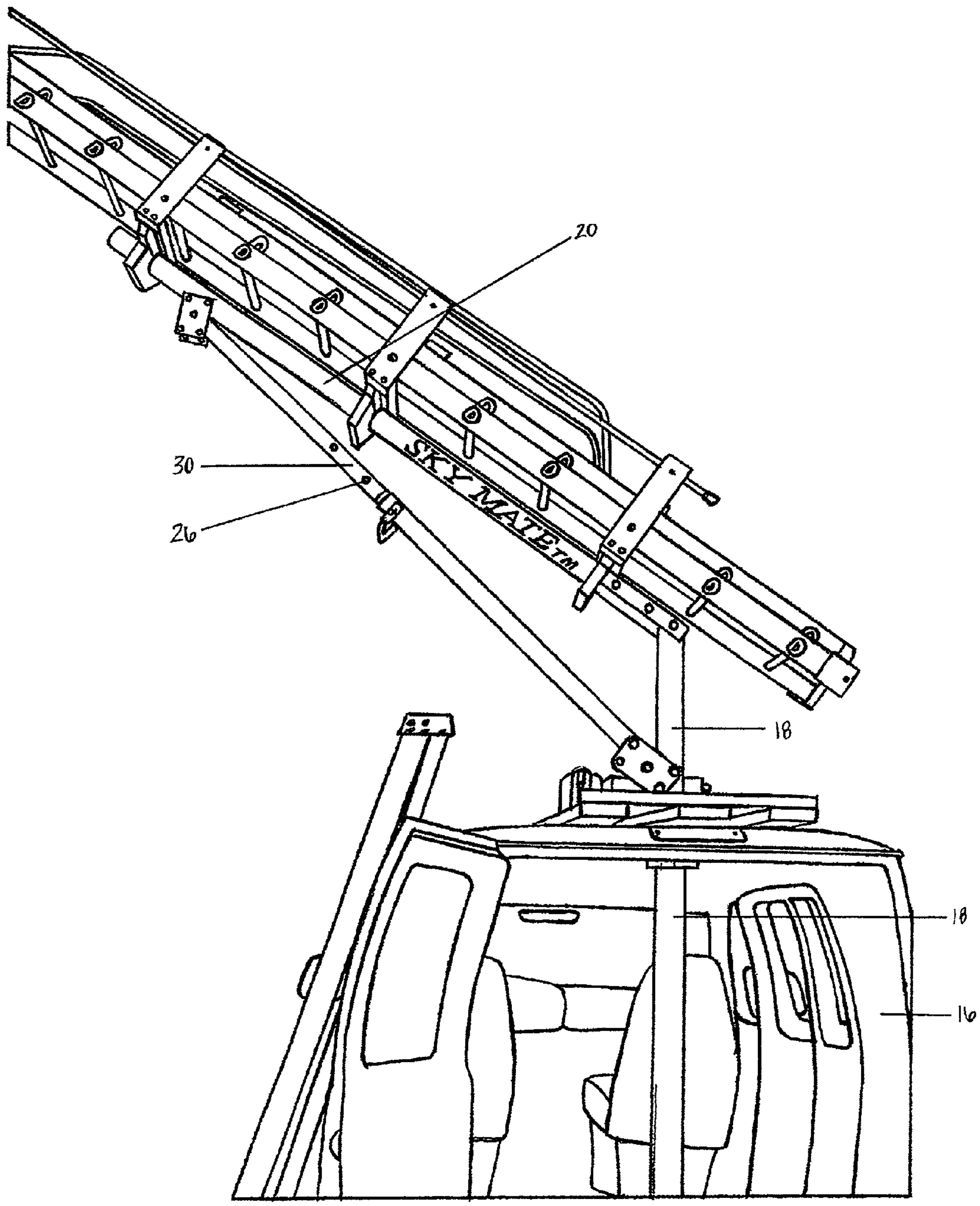
FIG. 3 is a rear view of the ladder apparatus mounted on a vehicle.

As shown in FIGS. 1 and 2, the ladder apparatus 10 generally has a mounting support 18, a main support 20 and a torsion support 30. FIG. 3 shows the mounting support 18 which anchors a portion of the ladder apparatus 10 into the vehicle 16. The mounting support 18 is capable of rotating 360° about a vertical axis, and serves to provide complete rotational movement, both clockwise and counter-clockwise, of the apparatus. A main ladder support 20 is pivotally connected to the mounting support 18, and a torsion support 30 is pivotally connected to both the main ladder support 20 and the mounting support 18.

Referring to FIG. 1, specifically the mounting support 18 has a proximal end 18*a* and a distal end 18*b*, the main ladder support 20 has a proximal end 20*a* and a distal end 20*b*, and the torsion support has a proximal end 30*a* and a distal end 30*b*. In one embodiment, the proximal end of the main ladder support 20*a* is pivotally connected to the proximal end of the mounting support 18*a*, the distal end of the torsion support 30*b* is pivotally connected to the distal end of the main ladder support 20*b*, and the proximal end of the torsion support 30*a* is connected to the distal end 18*b* of the mounting support. As illustrated in FIG. 3, one of the benefits of the orientations of the connections of the mounting support 18, the main ladder support 20 and the torsion support 30 is the ability of the ladder apparatus to be functional in multiple directions as will be discussed below.

Figure 4:
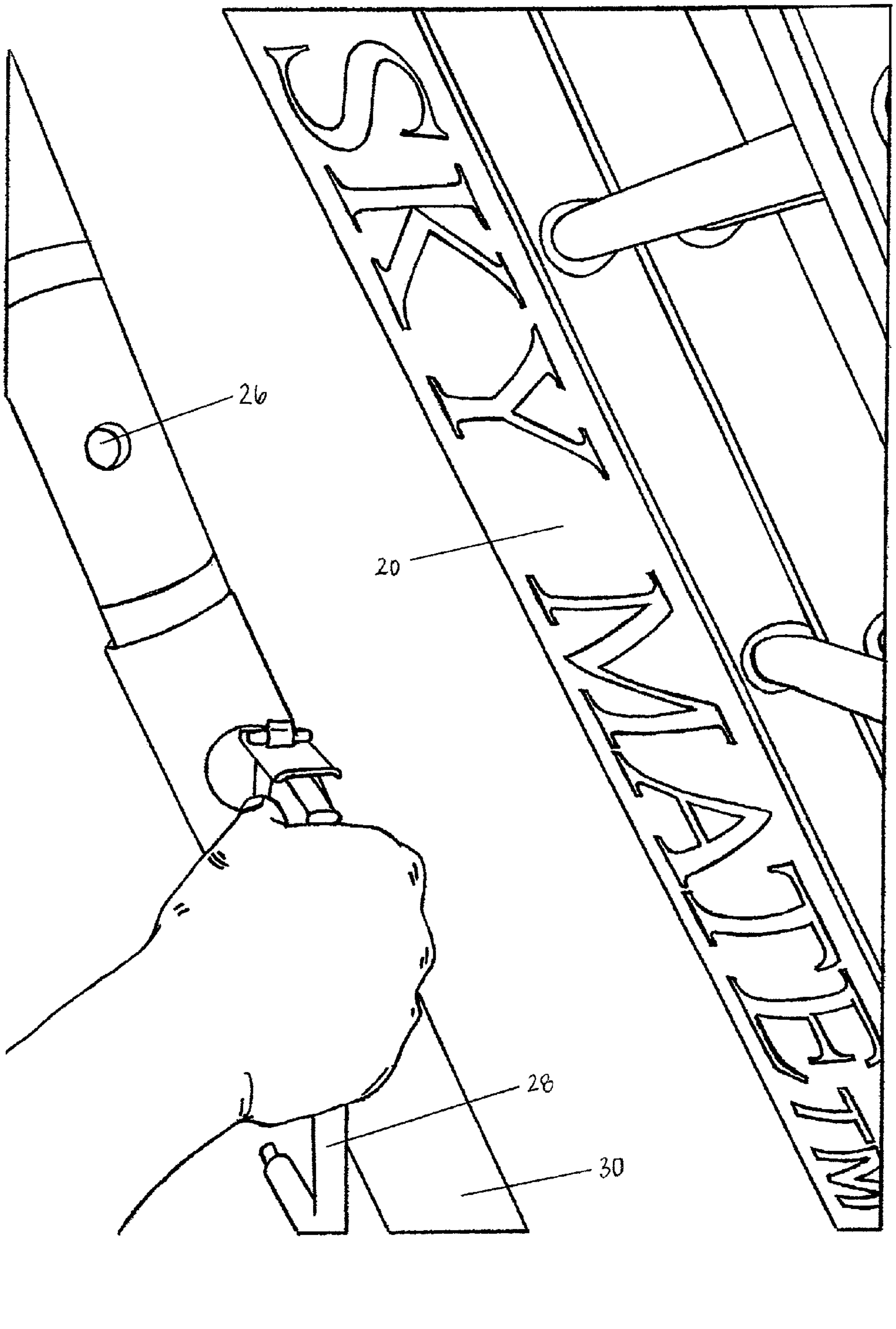
FIG. 4 is a partial enlarged perspective view of the torsion support of the ladder apparatus.
Figure 5:
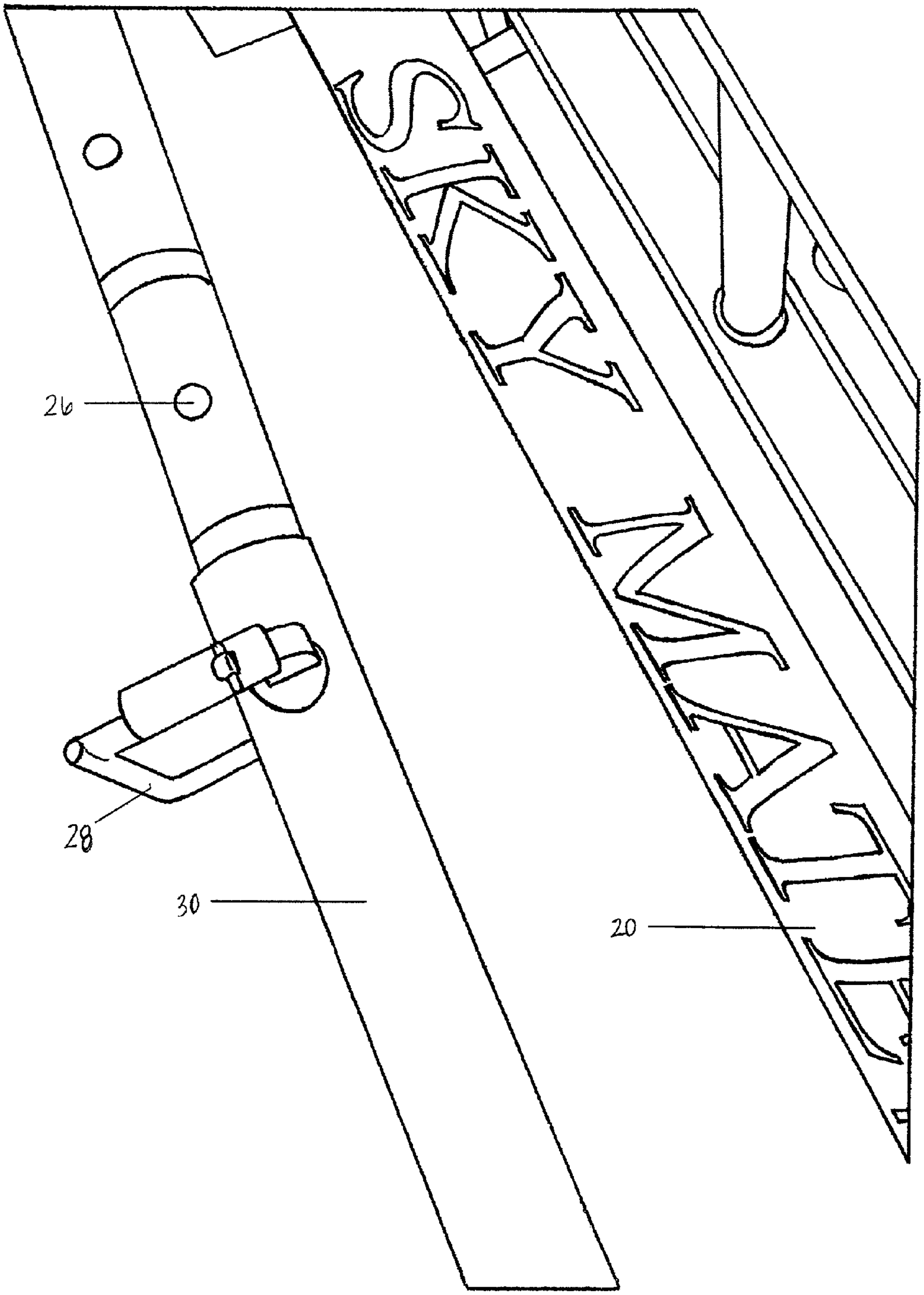
FIG. 5 is a partial enlarged perspective view of a torsion pin engaged in the torsion support of the ladder apparatus.

The height or angular position of the ladder apparatus 10 is adjustable based on the position of the torsion support 30. In one embodiment, the torsion support 30 is telescoping. In FIGS. 1 and 2, the torsion support 30 is collapsed while in FIGS. 3-5, for example, it is extended. As shown in FIGS. 3-5 the torsion support 30 has a plurality of torsion pinholes 26. In one embodiment, the torsion support 30 has four torsion pinholes 26, however any number of torsion pinholes can be made available. The torsion pinholes 26 allow a user to set the angular position of the main ladder support 20 by inserting a torsion pin 28 to the desired torsion pinhole 26, as seen in FIGS. 4 and 5. For example, in the embodiment shown in FIGS. 3 and 14, the angular position of the main ladder support 20 is capable of being adjusted from approximately 22°, 44°, 66°, or 88° relative to the roof of the vehicle 16, which operates to adjust the extension ladder 14 to various heights.

Figure 7:
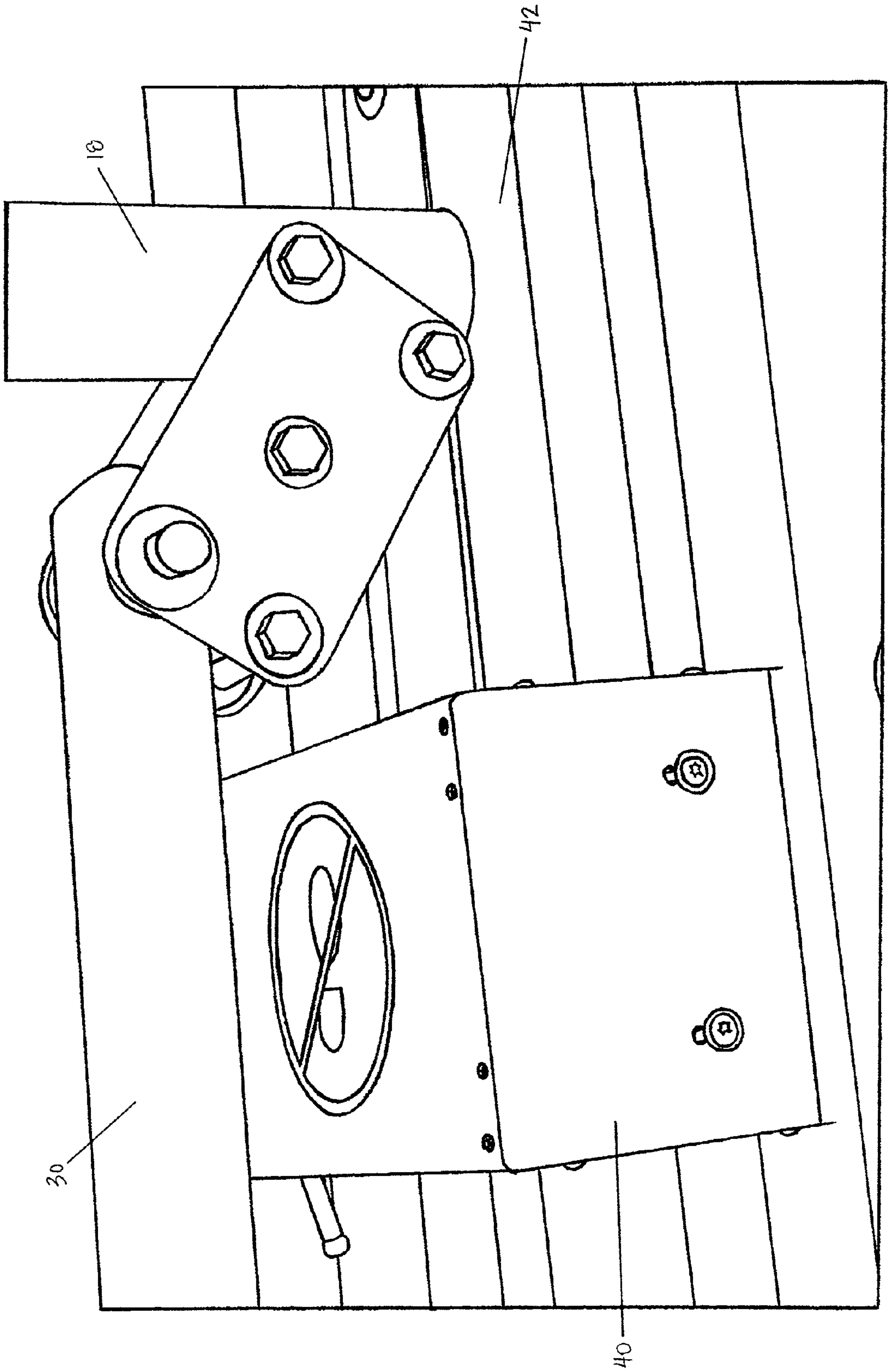
FIG. 7 is a partial enlarged perspective view of the brake box and mounting support of the ladder apparatus.

The rotational position of the ladder apparatus 10 is adjustable via the mounting support 18 and the brake box 40. In one embodiment, a brake box 40 is located adjacent the mounting support 18 on the roof of the vehicle 16 which is illustrated in FIG. 7. The brake box 40 has a rotation brake 42 that when engaged stops the mounting support from rotating, and when disengaged allows complete 360° rotation, both clockwise and counter-clockwise, about the vertical axis of the mounting support 18. The brake box 40 functions to secure the mounting support 18 in a predetermined rotational position. One of the benefits of the rotational capabilities of the mounting support 18 is that a user can access a wide radius of work spaces while keeping the vehicle parked in one location.

As discussed above, the mounting support 18 is capable of rotating 360°. When the ladder apparatus 10 is in the home position, the rotation brake 42 is engaged and the mounting support 18 does not move. When a user is ready to rotate the ladder apparatus 10 to a specific position, the rotation brake 42 is disengaged and the ladder support 10 is positioned in a specific rotational direction. Once a desired position is reached, the rotation brake 42 is engaged so that the apparatus is secured to a set rotational position and a user can safely ascend up the extension ladder 14. The present invention contemplates various brake means that can be used to control the rotational position of the mounting support 18, one of which is shown in FIG. 7.

Figure 6:
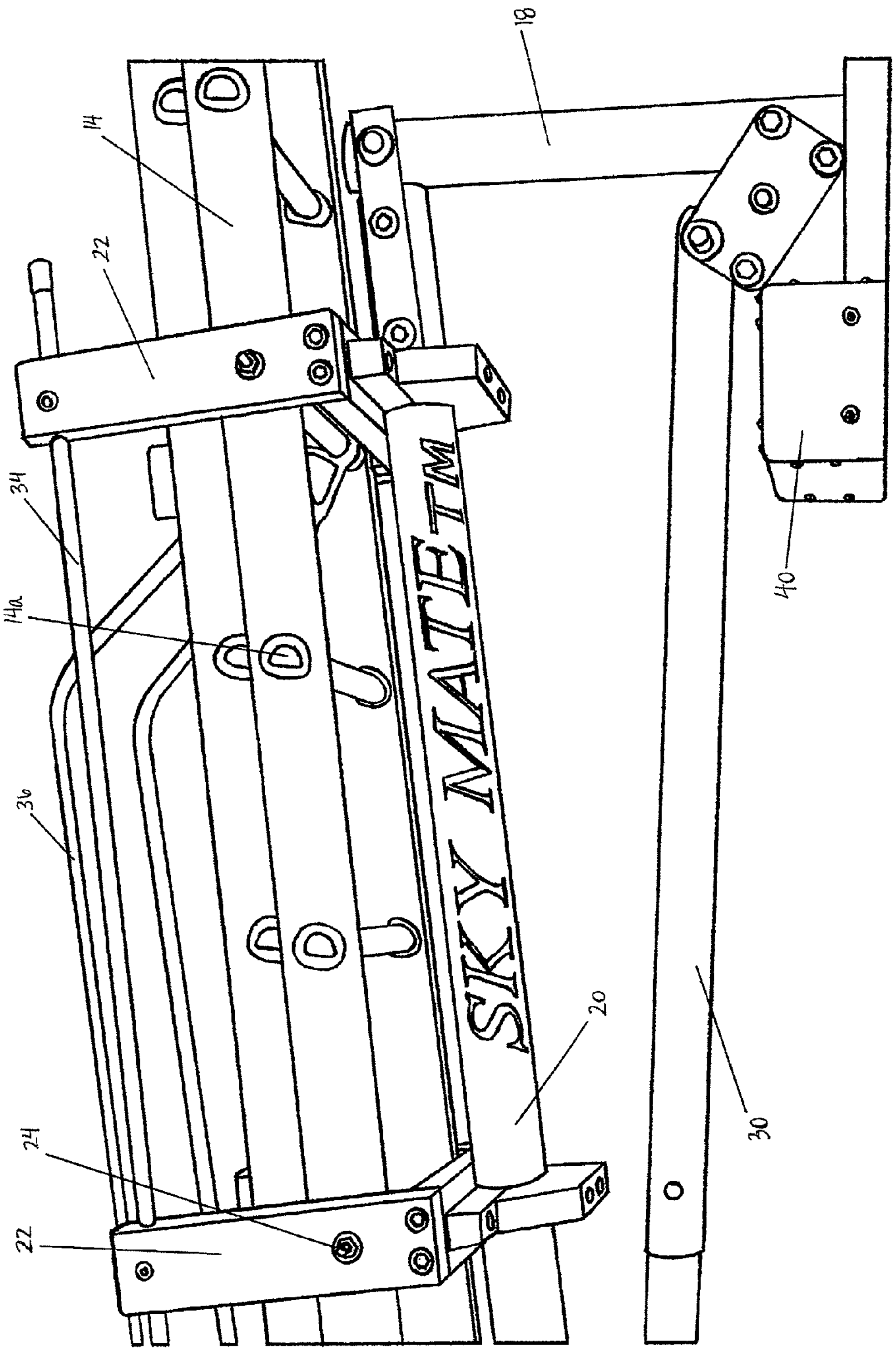
FIG. 6 is a partial enlarged perspective view of the ladder brackets of the ladder apparatus.
Figure 8:
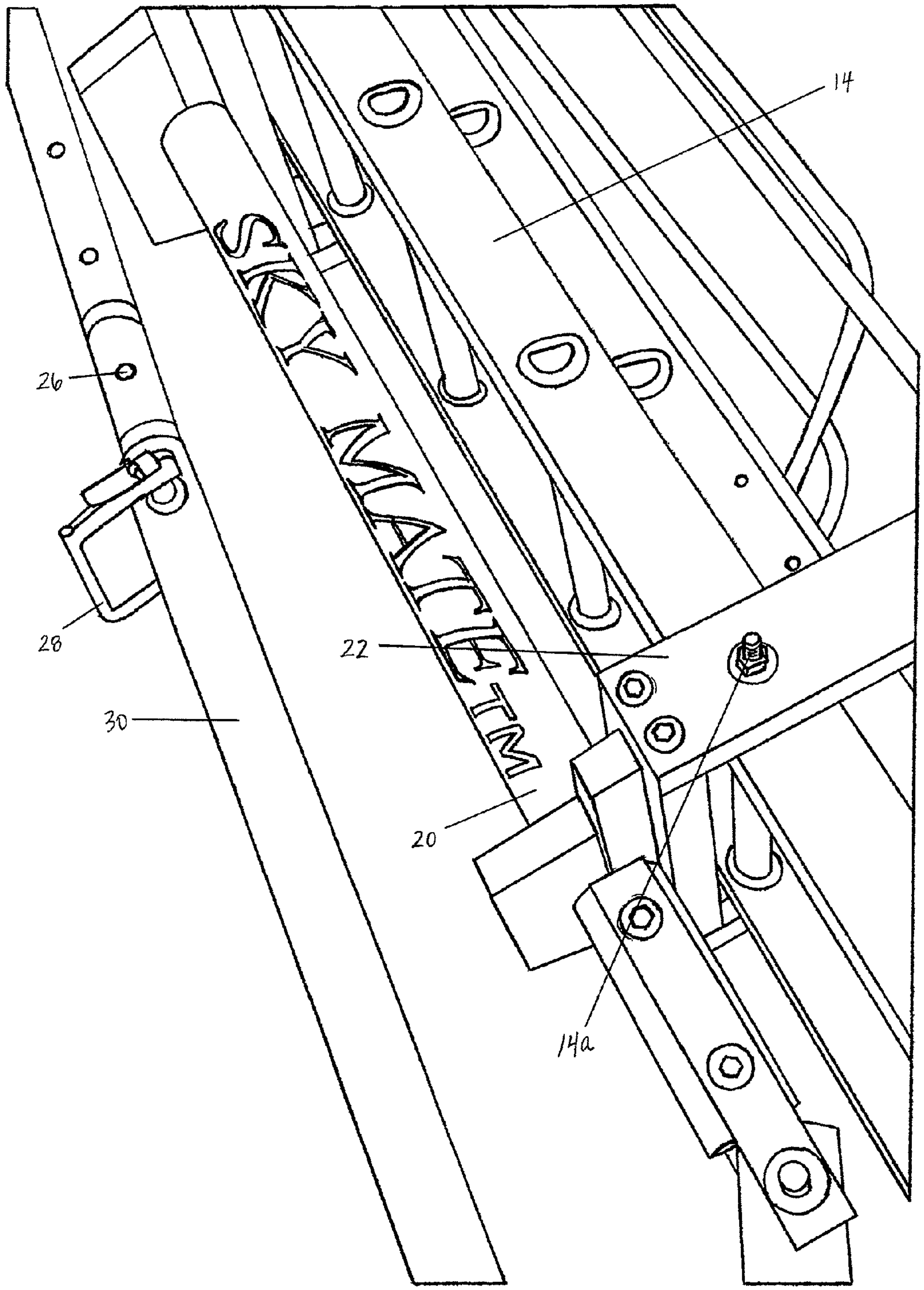
FIG. 8 is a partial enlarged perspective view of the ladder brackets of the ladder apparatus.

FIGS. 1, 6 and 8 depict the main ladder support 20 having plurality of ladder brackets 22 for receiving and securing portions of the ladder 14. An added benefit of the present invention is that it is capable of utilizing any size extension ladder 14; therefore a user does not need to buy a custom ladder in order to use the ladder apparatus 10 of the present invention. The ladder brackets 22 can vary in size and shape. FIG. 8 shows the ladder bracket 22 having a generally U-shape for adequately receiving the width of a standard ladder. Although the ladder brackets 22 are dimensioned for receiving a standard ladder, the present invention contemplates having adjustable ladder brackets 22 for receiving ladders of various sizes. In one embodiment, four ladder brackets 22 are used, however, the number of ladder brackets 22 can vary depending on the size and construction of the extension ladder 14.

The extension ladder 14 may be secured to the ladder brackets 22 by various means, one of which is by running a ladder support rod 24 through the rungs 14*a* of the ladder 14 and fastening it to the ladder bracket 22, as shown in FIGS. 6 and 8. In one embodiment, ladder bracket clamps 32 may be used to clamp the ladder bracket 22 to the main ladder support 20. As further illustrated in FIG. 6, a pair of exterior guard rails 34 are positioned to securely fasten to each of the ladder brackets 22. The exterior guard rails 34 function as a safety rail for a user to grab on while ascending and descending the ladder 14. An interior guard rail 36 may be attached directly to the ladder 14 to provide an additional safety rail and to maintain the ladder 14 taut.

Figure 9:
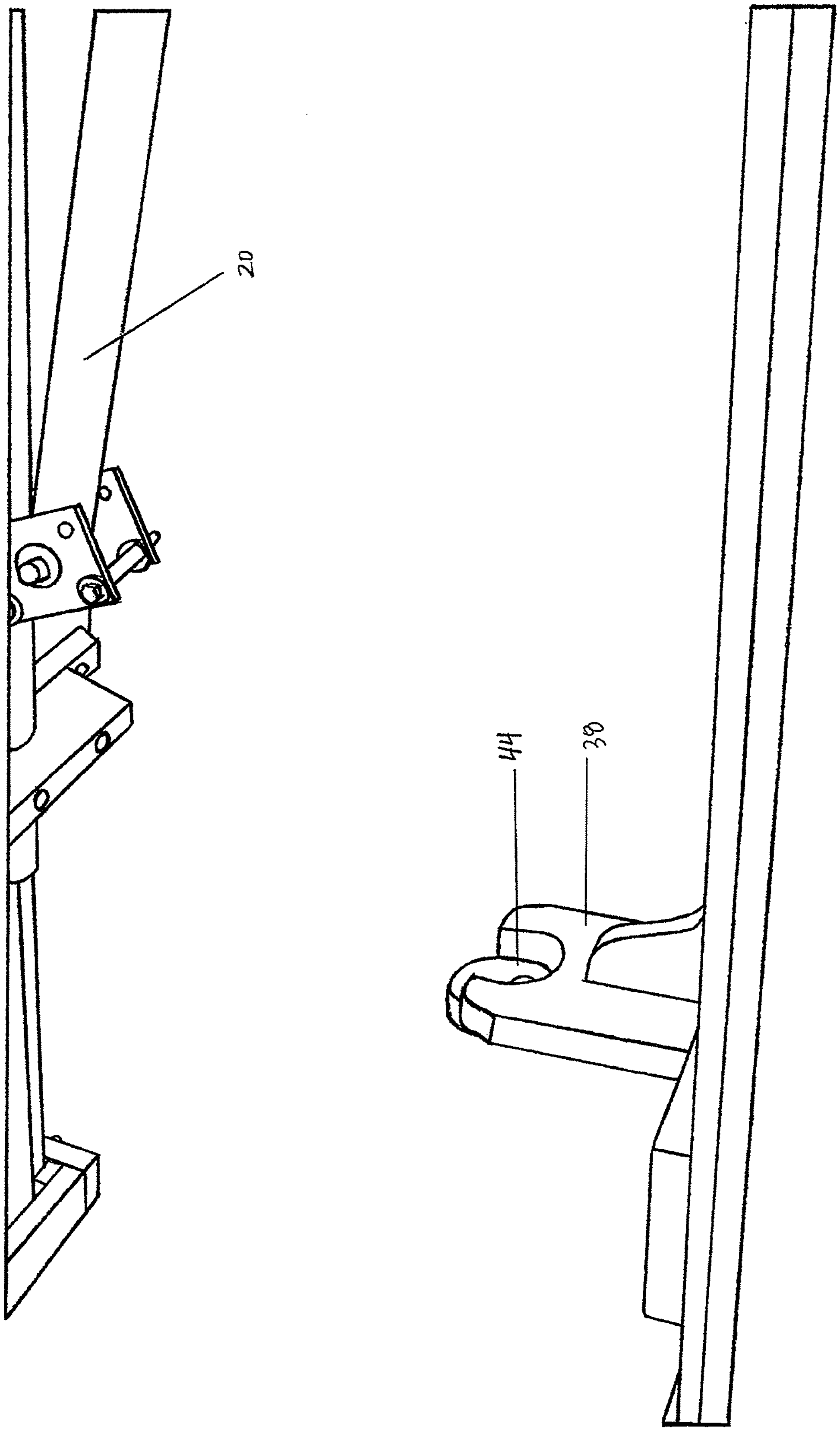
FIG. 9 is a partial enlarged perspective view of the saddle of the ladder apparatus.
Figure 10:
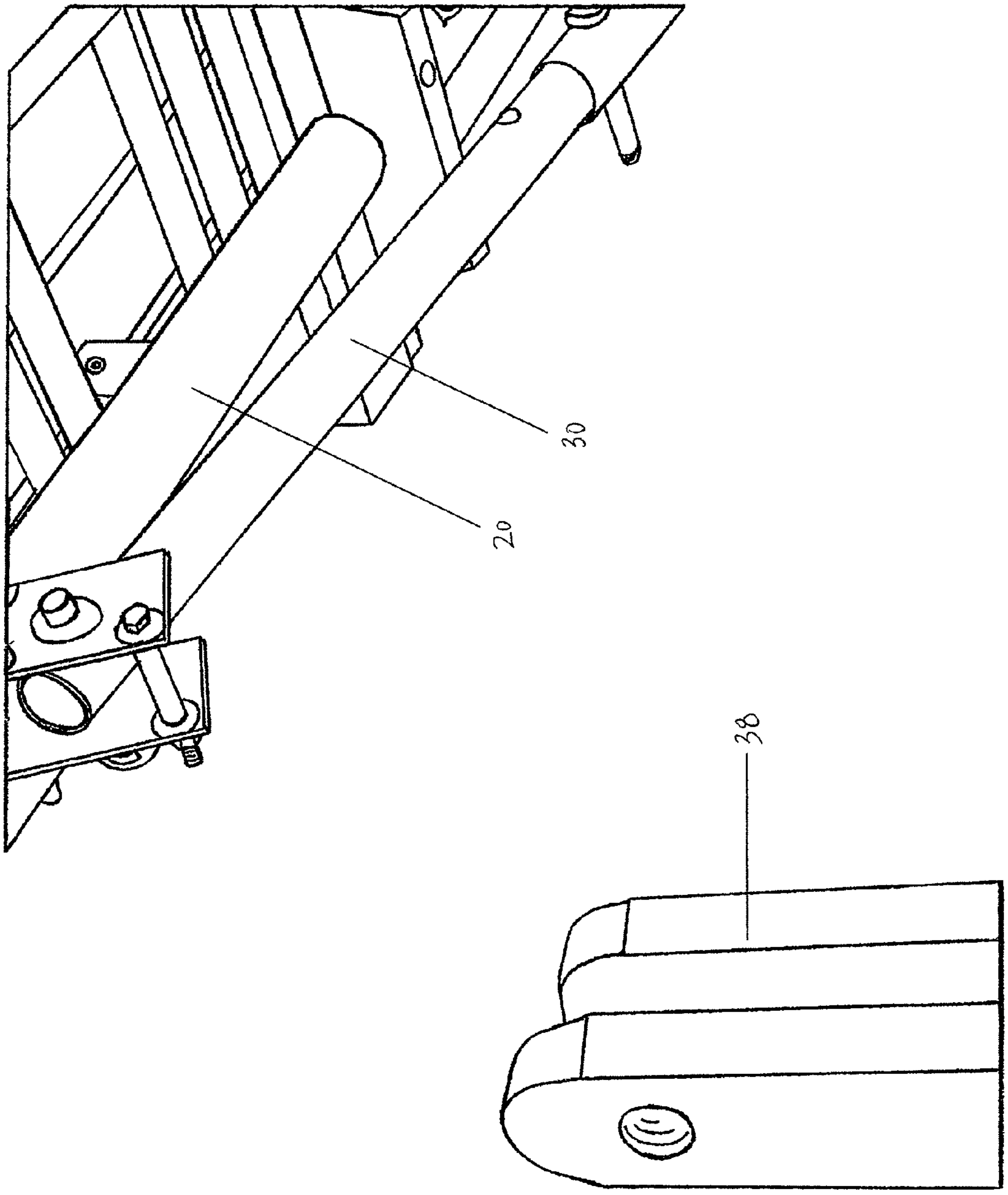
FIG. 10 is a partial enlarged perspective view of the saddle of the ladder apparatus.
Figure 11:
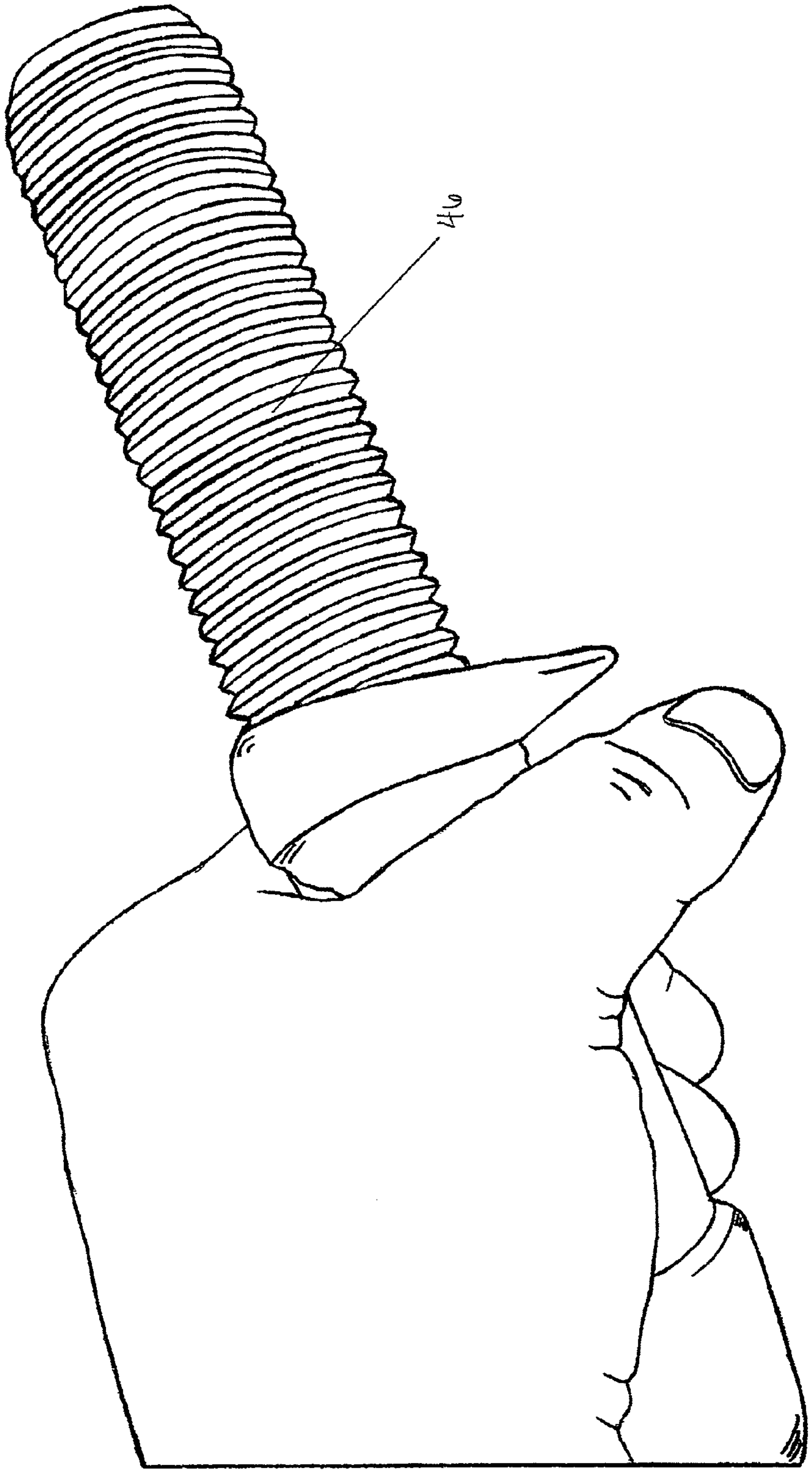
FIG. 11 is a partial enlarged side view of the torsion pin of the ladder apparatus.
Figure 12:
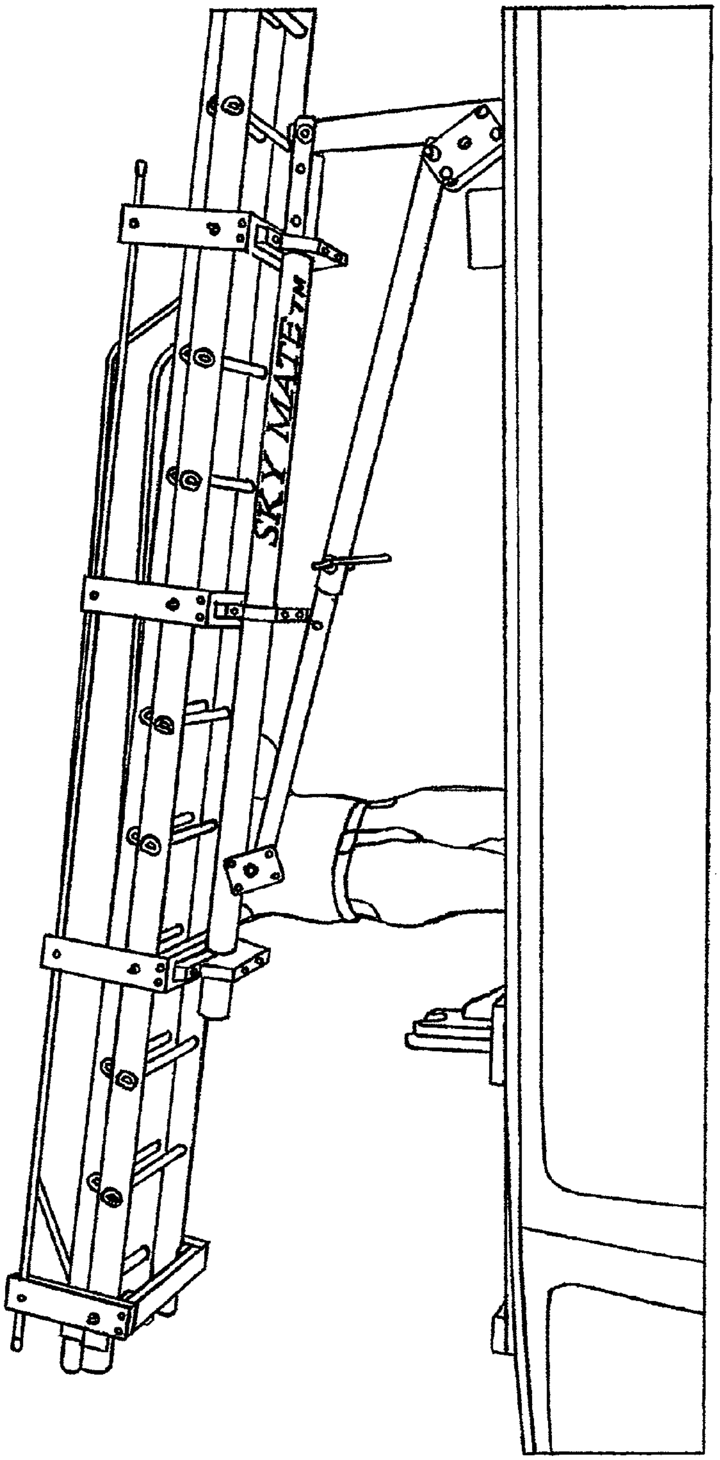
FIG. 12 is a perspective view of the ladder apparatus being disengaged from the saddle.
Figure 13:
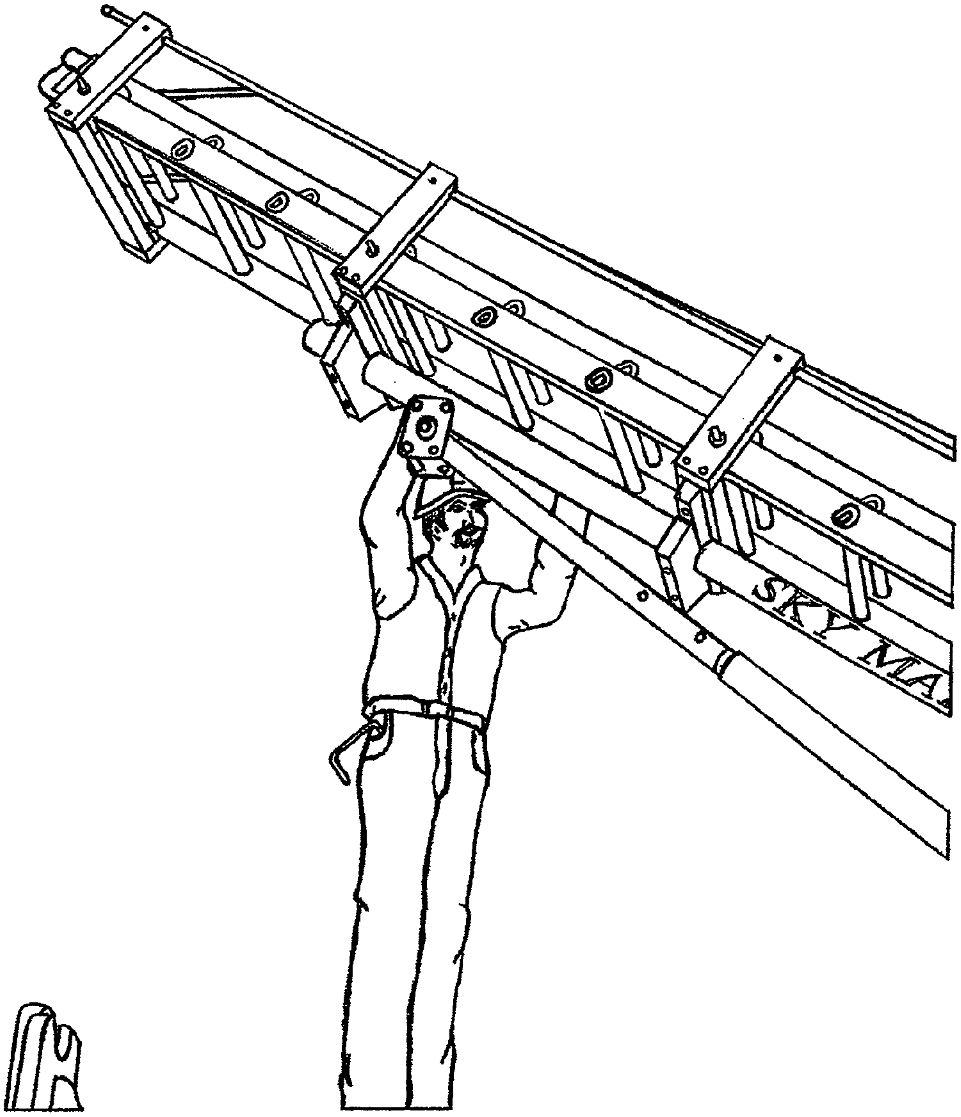
FIG. 13 is a perspective view of the ladder apparatus lifted to a desired angular position.
Figure 14:
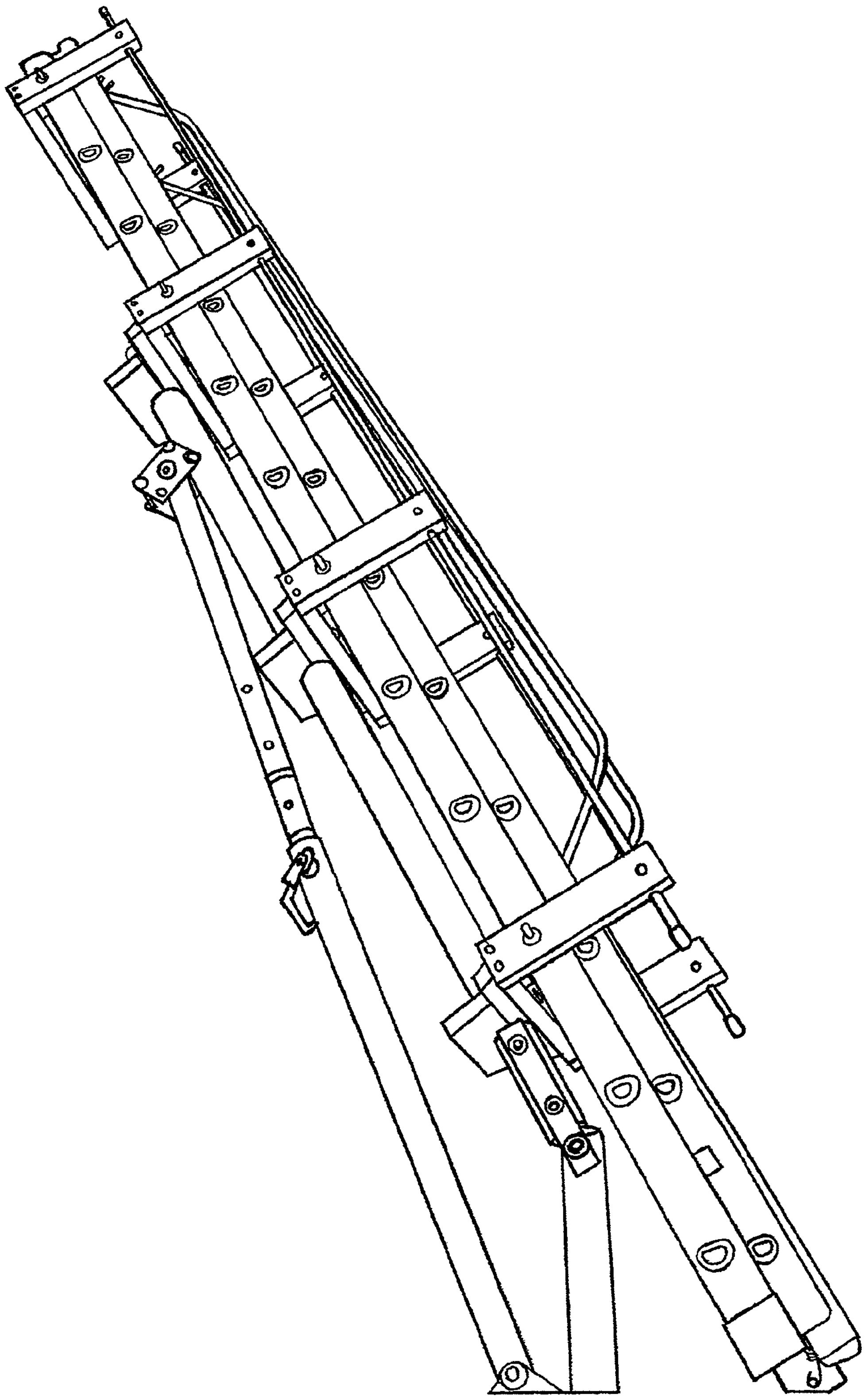
FIG. 14 is a perspective view of the ladder apparatus engaged in a desired angular position.
Figure 15:
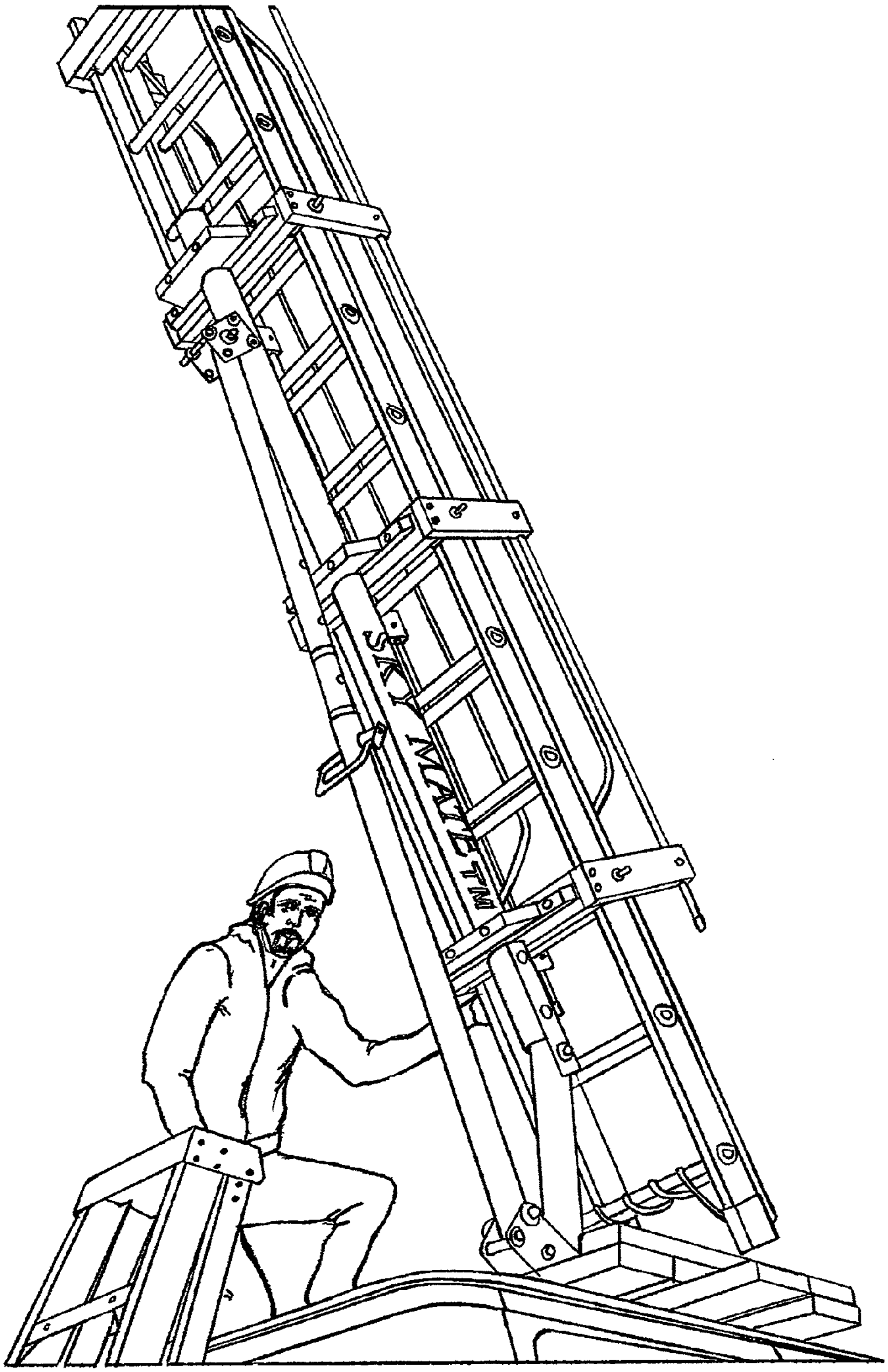
FIG. 15 is a perspective view of the ladder apparatus pivoting about the vertical axis of the mounting support.

The present invention contemplates various means that can be used to secure the ladder apparatus 10 to the roof of the vehicle 16 when the apparatus is in a retracted position, one of which is shown in FIG. 2. FIGS. 2, 9 and 10 illustrate how the ladder apparatus 10 is secured to the top of the vehicle 16. The ladder apparatus 10 is secured in a home position to the top of the vehicle 16 via a saddle 38 when not in use. The saddle 38 has an opening 44 for receiving a portion of the ladder apparatus 10. In one embodiment, the saddle 38 receives a top portion of the main ladder support 20, as shown in FIG. 9. The top portion of the main ladder support 20 is designed to receive a home pin 46 which is illustrated in FIG. 10. In the home position, the home pin 46 tightly fastens the main ladder support 20 to the saddle 38. FIG. 11 shows that the home position pin 46 can be a thread screw which securely fastens the ladder apparatus 10 in the home position when not in use. The thread screw 46 allows a user to keep the ladder apparatus 10 securely in place on top of the vehicle even as the vehicle is in motion.

The ladder apparatus 10 of the present invention is designed for use in connection with a vehicle, such as but not limited to a utility van or a pick-up truck. Installation of the ladder apparatus 10 will vary based the type of vehicle used. In one embodiment of the present invention, the ladder apparatus 10 can be installed and mounted to a utility van commonly used by contractors, such as a half-ton utility van. As shown in FIG. 3 the mounting support 18 is anchored into the vehicle 16 along a vertical axis. The saddle 38 can be directly mounted on the top of the vehicle 16 so that the receiving portion 44 of the saddle 38 is parallel to the mounting support 18. Alternatively, a base can be mounted on the top of the vehicle 16 which receives the saddle 38 and assists in supporting the mounting support 18. In another embodiment, the present invention can be mounted on the bed of a pick-up truck.

The ladder apparatus 10 of the present invention may be mounted inside and on top of a utility van as described above. To access the ladder safely, an eight foot access ladder can be propped on the side of the vehicle so a user can safely climb to the roof of the vehicle. It is helpful to have the torsion pin 28 readily accessible for use once on top of the vehicle.

FIGS. 12-17 show the ladder apparatus 10 in operation. To extend the ladder apparatus 10, a user removes the thread screw 46 and raises the ladder 14 from the saddle 38, from a retracted home position, to a desired angular position. The desired angular position is based on the height that the user wants to set the ladder. As the apparatus is raised, the main ladder support 20 and the torsion support 30 pivot upwardly to extend the ladder apparatus. It is helpful to keep the torsion pin 28 accessible, because once the ladder 14 is raised to a desired height, the torsion pin 28 is inserted in one of the torsion pinholes 26 of the torsion support 30. This secures the ladder 14 to the desired angle of incline. As discussed above, the number of torsion pinholes 26 will determine the various possible angles and height the ladder 14 can be adjusted.

Once the ladder apparatus is in an extended position the apparatus can be rotated to a desired rotational position. As discussed above, one benefit of the present invention is that the ladder apparatus 10 allows for full 360° rotation about the vertical axis of the mounting support 18 in both clockwise and counter-wise directions. This allows a user full range accessibility when in the field. To secure the ladder 14 to a desired rotational position about the vertical axis of the mounting support 18, the rotation brake 42 is released and the mounting support 18 is rotated to a desired position. To secure the ladder 14 in a specific rotational position, the rotation brake 42 is once again applied. It is recommended that a user first sets the angular position of the ladder prior to changing the rotational position of the ladder.

Figure 16:
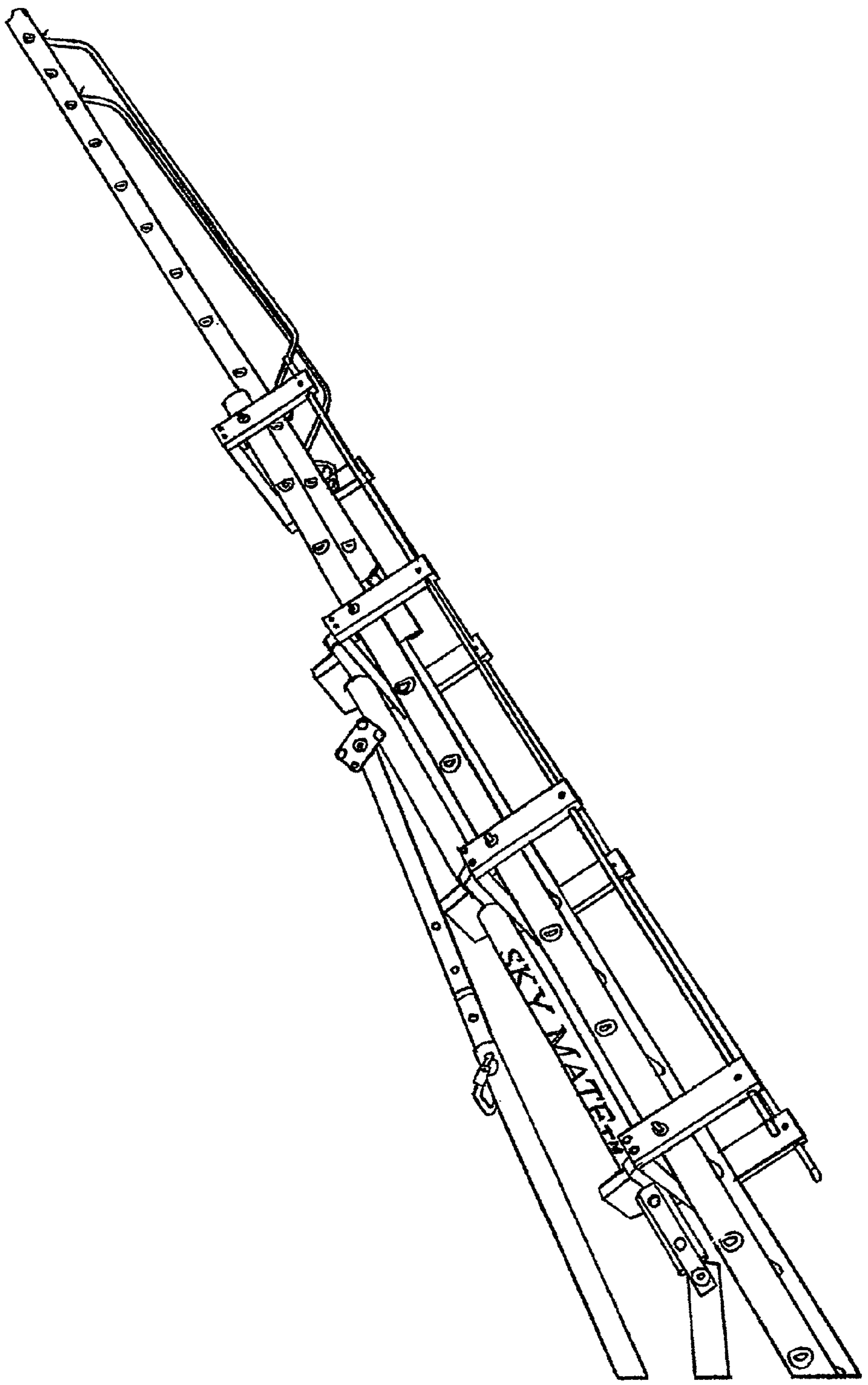
FIG. 16 is a perspective view of the ladder apparatus with the extension ladder extended.
Figure 17:
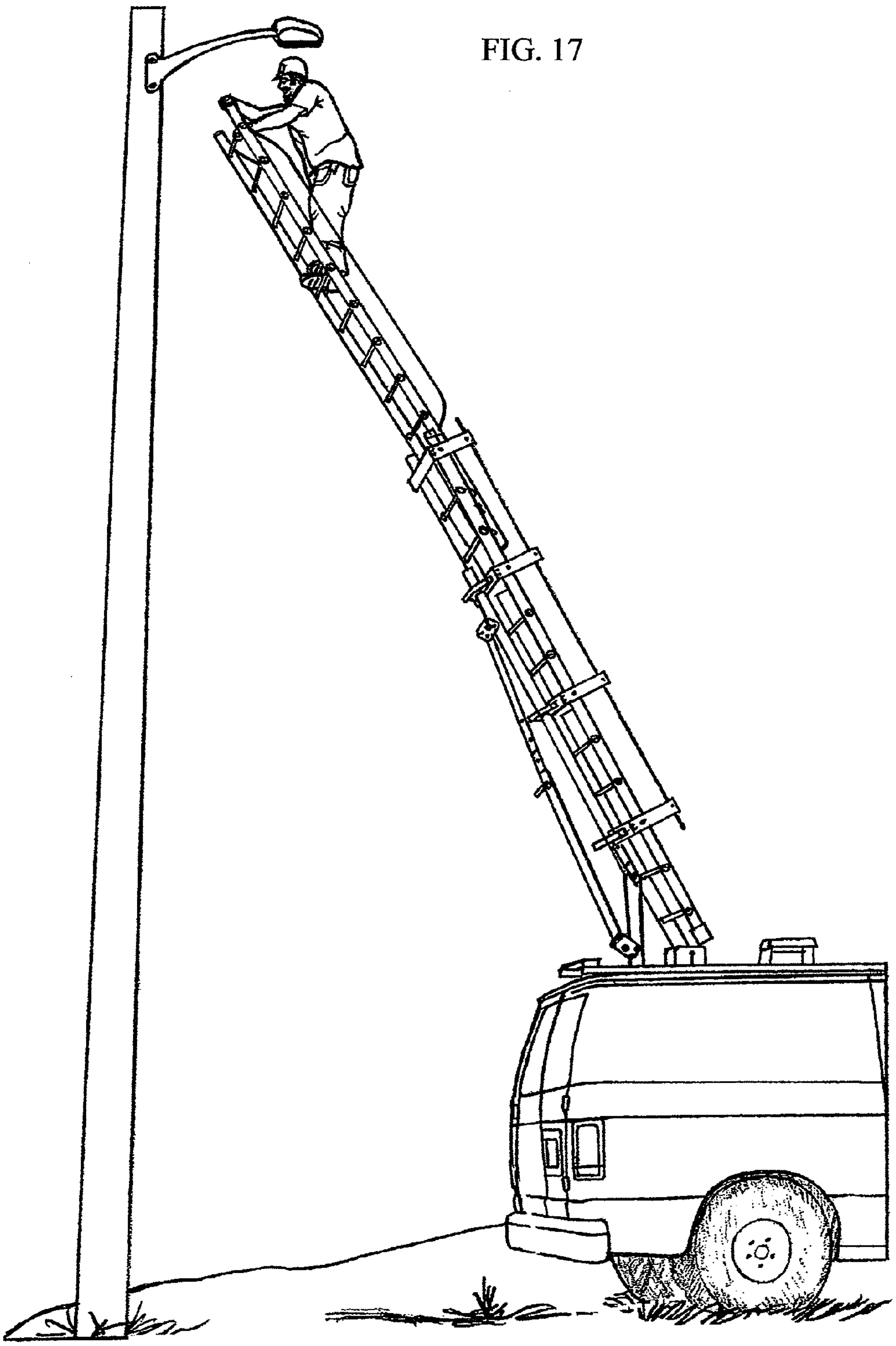
FIG. 17 is a perspective view of a user ascending the ladder apparatus at a desired height and rotational position.

If a user would like additional height, then the extension ladder 14 can be extended via a traditional pulley system which is shown in FIG. 16. The ladder apparatus 10 of the present invention, allows use of an extension ladder 14 that extends up to thirty-two feet in the air. A significant benefit of the present invention, is that it allows a user to utilize a ladder on-site which does not have to lean or touch a support, and requires no footing at the bottom of the ladder. This design feature allows the ladder apparatus to be operated by a single user.

To retract the ladder apparatus 10 back to its home position, the extension ladder 14 is retracted and secured. The rotation brake 42 is released and the main ladder support 20 is aligned with the receiving portion 44 of the saddle 38 opening. The rotation brake is then applied and the torsion pin 28 is removed from the torsion pinhole 26 of the torsion support 30. The main ladder support 20 is lowered into the receiving portion 44 of the saddle 38, and the home pin 46 tightly fastens the main ladder support 20 back into the saddle 38.

The ladder apparatus 10 of the present invention has various uses, and can be particularly useful for service and repair jobs involving maintenance of telephone lines, electrical lines, landscaping, signage and the like. Such service and repair jobs often require several people to accomplish due to the cumbersome equipment; the present invention offers a simplified the ladder system so a single user can tend to difficult jobs by themselves. Since the ladder apparatus does not require rams, pumps, hoses or fluid it requires very low maintenance and is particularly effective in adverse weather conditions. The bucket trucks and power baskets of the prior art often become inoperable in adverse weather because the rams, pumps, and hoses can freeze and obstruct the operation. Furthermore, the ladder apparatus of the present invention can be used with a traditional half-ton vehicles and is therefore fuel efficient compared to the bucket trucks and power baskets of the prior art.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

What is claimed is:

1. A ladder apparatus comprising:

a mounting support;

a main ladder support having a proximal end and a distal end separated by a distance which defines a length of said main ladder support, the main ladder support being capable of receiving a ladder having a length and a width wherein the length of said ladder is greater than the width of said ladder such that the length of said main ladder support and the length of said ladder are substantially parallel to each other when said ladder is received by said main ladder support; and a torsion support having a proximal end and a distal end separated by a distance which defines a length of said torsion support;

wherein the proximal end of the main ladder support is pivotally connected to the mounting support, the proximal end of the torsion support is pivotally connected to the mounting support and the distal end of the torsion support is pivotally connected to the main ladder support to raise the main ladder support from a home position to an extended position, wherein, when in the extended position, the main ladder support can be set to a desired angular position with respect to a substantially horizontal plane and can be set to a desired rotational position with respect to a substantially vertical axis.

2. The ladder apparatus of claim 1 wherein the mounting support is secured to a vehicle.

3. The ladder apparatus of claim 2, wherein said proximal end of said main ladder support is attached to said mounting support and wherein a saddle is secured to the top of the vehicle for receiving a portion of the distal end of said main ladder support.

4. The ladder apparatus of claim 3 wherein the main ladder support is secured to the saddle with a home position pin.

5. The ladder apparatus of claim 1, further including a plurality of ladder brackets connected along the length of said main ladder support.

6. The ladder apparatus of claim 5, wherein an exterior guard rail is secured along the plurality of ladder brackets.

7. The ladder apparatus of claim 1, wherein an interior guard rail is secured along the length of the ladder.

8. The ladder apparatus of claim 1, wherein the torsion support has a plurality of torsion pinholes spaced along the length of said torsion support.

9. The ladder apparatus of claim 8 wherein the torsion support is capable of receiving a torsion pin for adjusting the angular position of the main ladder support.

10. The ladder apparatus of claim 1, wherein the mounting support can rotate 360°.

11. The ladder apparatus of claim 1, wherein the mounting support can rotate in a clockwise direction.

12. The ladder apparatus of claim 1, wherein the mounting support can rotate in a counter clockwise direction.

13. The ladder apparatus of claim 1, further comprising a brake box for engaging and disengaging the mounting support.

14. A ladder apparatus comprising:

a mounting support;

a main ladder support having a proximal end and a distal end separated by a distance which defines a length of said main ladder support, the main ladder support being capable of receiving a ladder;

a torsion support having a proximal end and a distal end separated by a distance which defines a length of said torsion support; and a plurality of U-shaped brackets connected along the length of said main ladder support, at least one of said brackets further including a ladder support rod extending from one side of said U-shape to the other side of said U-shape;

wherein the proximal end of the main ladder support is pivotally connected to the mounting support, the proximal end of the torsion support is pivotally connected to the mounting support and the distal end of the torsion support is pivotally connected to the main ladder support to raise the main ladder support from a home position to an extended position, wherein, when in the extended position, the main ladder support can be set to a desired angular position with respect to a substantially horizontal plane and can be set to a desired rotational position with respect to a substantially vertical axis.

15. The ladder apparatus of claim 14 wherein the mounting support is secured to a vehicle.

16. The ladder apparatus of claim 15, wherein said main ladder support includes a proximal end and a distal end, said proximal end being attached to said mounting support and wherein a saddle is secured to the top of the vehicle for receiving a portion of the distal end of said main ladder support.

17. The ladder apparatus of claim 16 wherein the main ladder support is secured to the saddle with a home position pin.

18. The ladder apparatus of claim 14, wherein a guard rail is secured along the plurality of ladder brackets.

19. The ladder apparatus of claim 14, wherein the torsion support has a plurality of torsion pinholes spaced along the length of said torsion support capable of receiving a torsion pin for adjusting the angular position of the main ladder support.

20. A ladder apparatus comprising:

a mounting support;

a main ladder support having a proximal end and a distal end separated by a distance which defines a length of said main ladder support, said proximal end of said main ladder support being attached to said mounting support and said main ladder support being capable of receiving a ladder having a length and a width wherein the length of said ladder is greater than the width of said ladder such that the length of said main ladder support and the length of said ladder are substantially parallel to each other when said ladder is received by said main ladder support;

a torsion support having a proximal end and a distal end separated by a distance which defines a length of said torsion support; and a saddle secured to the top of a vehicle for receiving the distal end of said main ladder support;

wherein the proximal end of the main ladder support is pivotally connected to the mounting support, the proximal end of the torsion support is pivotally connected to the mounting support and the distal end of the torsion support is pivotally connected to the main ladder support to raise the main ladder support from a home position to an extended position, wherein, when in the extended position, the main ladder support can be set to a desired angular position with respect to a substantially horizontal plane and can be set to a desired rotational position with respect to a substantially vertical axis and wherein said saddle only receives said distal end of said main ladder support when said main ladder support is in the home position.

* * * * *